Patented May 13, 1947

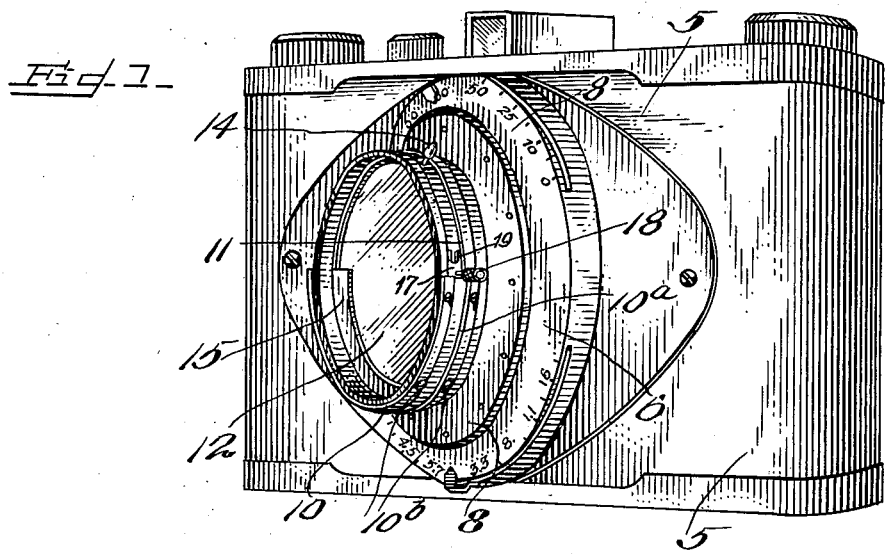
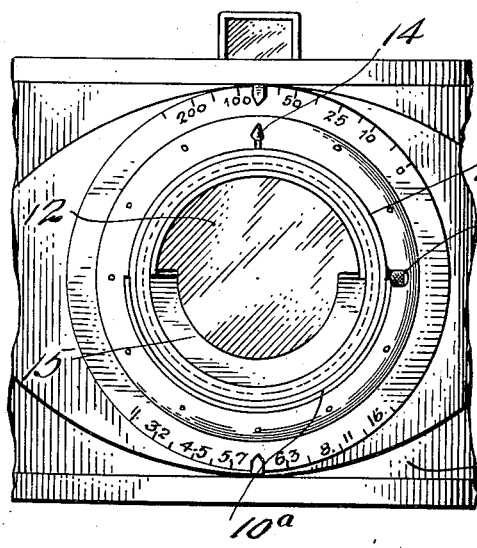
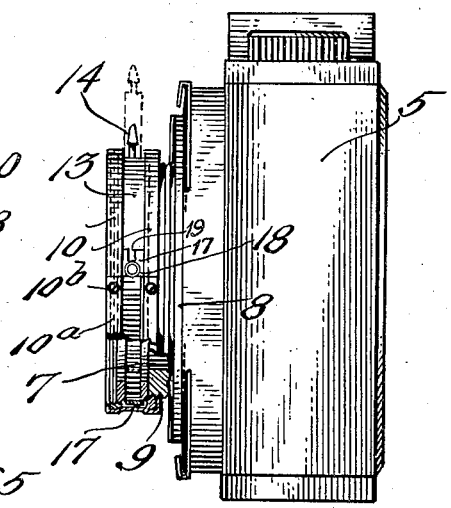

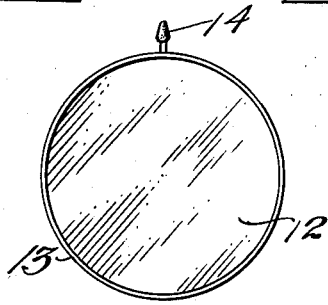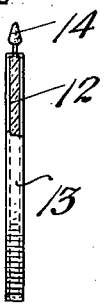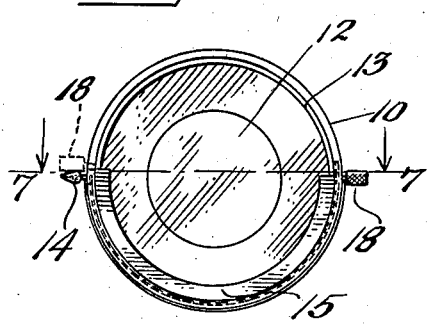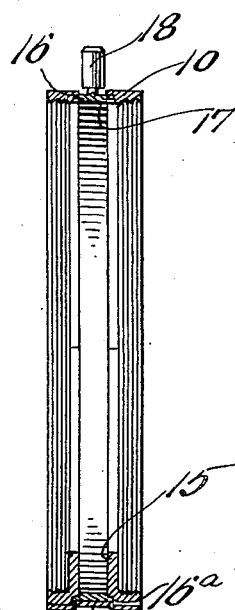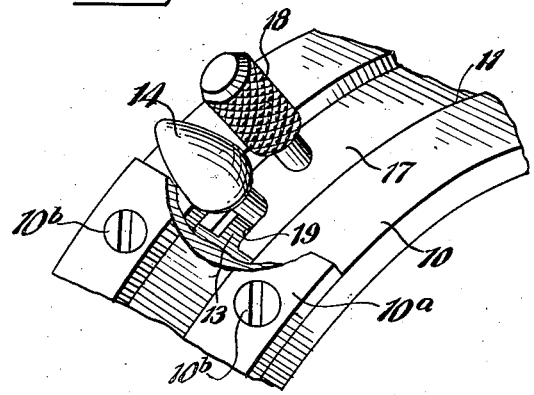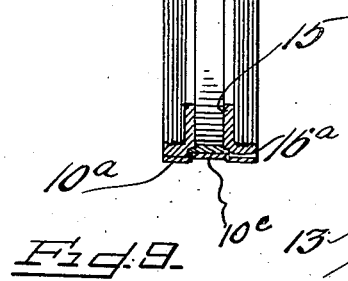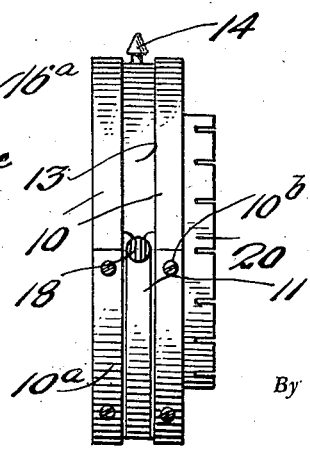

2,420,379

UNITED STATES PATENT OFFICE 2,420,379

FILTER ADAPTER FOR CAMERAS

Gerald George Mills, Daly City, Calif.

Application February 15, 1945, Serial No. 577,984

1 Claim. (Cl. 95—81.5)

The present invention relates to a new and useful improvement in cameras and more particularly to an adapter secured to the shutter of the camera over the lens mount and in which a filter is removably carried in a position for covering the lens.

An important object of the present invention is to provide a device of this character by means of which the filter may be quickly and easily removed when desired and embodying means for locking the filter in position against accidental loss or removal.

A still further object is to provide an attachment of this character of simple and practical construction, which is efficient and reliable in use, neat and attractive in appearance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view of a camera showing the filter adapter positioned thereon.

Figure 2 is a fragmentary front elevational view.

Figure 3 is a side elevational view with parts broken away and shown in section.

Figure 4 is a front elevational view of the filter.

Figure 5 is a side elevational view thereof, with sides broken away and shown in section.

Figure 6 is a front elevational view of the collar forming part of the adapter and in which the filter is removably mounted.

Figure 7 is a transverse sectional view of the collar.

Figure 8 is a fragmentary enlarged perspective view illustrating the handles for the filter and locking half ring therefor, and Figure 9 is a side elevational view of a modification.

Referring now to the drawings in detail wherein for the purpose of illustration I have disclosed a preferred embodiment of the invention. The numeral 5 designates a camera of conventional construction which includes the shutter mounting 6 and the lens mounting 7.

A plate 8 is riveted or otherwise secured to the shutter mounting 6 and is in the form of a ring surrounding the lens mounting 7, the plate having an externally threaded flange 9 projecting forwardly therefrom and surrounding the lens mounting.

A filter holder is provided which is formed of a pair of collars 10 connected to each other in spaced apart relation by means of a semi-circular or arcuate plate 10a secured to the collars by screws 10b, the center of the plate having an inwardly pressed rib 10c. The outer edge of each collar is internally threaded, one of the collars being threaded on the flange 9 and the other collar being adapted for threadedly receiving a sunshade of conventional construction (not shown). The upper half of the filter holder is open to form a slot 11 for removably receiving a filter 12 which includes a frame 13 extending around the edge of the filter to which a radially extending handle 14 is attached, the handle projecting outwardly of the slot 11 as shown to advantage in Figures 6 and 8 of the drawings. When placed in position between the collars 10, the filter will cover the interior of the holder and will occupy a position in front of the lens carried by the lens mount 7. The filter may be removed from the holder by sliding the same outwardly as shown by the dotted lines in Figure 3 of the drawings.

The interior of the collars 10 at a point diametrically opposite the slot 11 is formed with spaced parallel flanges 15 forming guides for the filter to provide a snug fit therefor between the collars.

The collars are also formed with internal grooves 16 in their upper portions adjacent the slot 11 and the opposed edges of the collars at their lower portions are formed with shoulders 16a, as shown to advantage in Figure 7 of the drawings, and slidably mounted in the grooves is a half-ring 17 adapted for closing the slot 11 outwardly of the frame 13 of the filter to secure the filter in position in the collar. When the half-ring is moved into its open position at the lower portion of the holder, the half-ring is retained in position in the holder by the plate 10a. The locking half-ring 17 is provided with a radially extending handle 18 for manipulating the locking half-ring; and one end of the half-ring is formed with a slot 19 adapted for receiving the handle 14 of the filter to prevent interference of the handle 14 in completely closing the slot, both the handles 14 and 18 being moved toward one side of the collar when the half-ring is moved into its locking position.

From the foregoing it will be apparent that the filter may be easily and quickly mounted in position over the lens of the camera when desired, and may be removed therefrom without necessitating a removal of the collar 10. In Figure 9 of the drawings one of the collars 10 is formed with an annular spring collar 20 to telescope over a lens mounting in certain types of conventional cameras.

Having thus described the invention, what I claim is:

A filter adapter for cameras comprising a pair of flat band collars spaced apart edgewise in concentric relation, a substantially semi-circular external plate connecting said collars in spaced apart relation and forming a bottom closure for said space throughout substantially one-half of the same whereby said space provides a half-circle slot between the collars and the ends of the plate adapted for introducing a circular filter into said collars for rotation therein, semi-circular internal bottom flanges on confronting edges of said collars adapted to guide the filter in rotation thereof, a semi-circular ring fitting between said confronting edges and slidable circumferentially of said collars to open and close said slot, said ring being confined between said edges by said plate and filter when slid into slot opening position and slidably interfitting with said edges when slid into slot opening position, and means to attach said collars to the camera in front of the lens of the same.

GERALD GEORGE MILLS.

REFERENCES CITED

The following references are of record in the file of this patent:

UNITED STATES PATENTS

| Number | Name | Date |
| --- | --- | --- |
| 1,806,209 | Major | May 19, 1931 |
| 2,241,596 | Guhl | May 13, 1941 |
| 1,780,384 | Green | Nov. 4, 1930 |
| 2,301,401 | Hennessy et al. | Nov. 10, 1942 |
| 2,352,844 | Loebe | July 4, 1944 |